No. 892,071. PATENTED JUNE 30, 1908.
F. McARTHUR.
FEEDING TROUGH.
APPLICATION FILED JAN. 18, 1907.
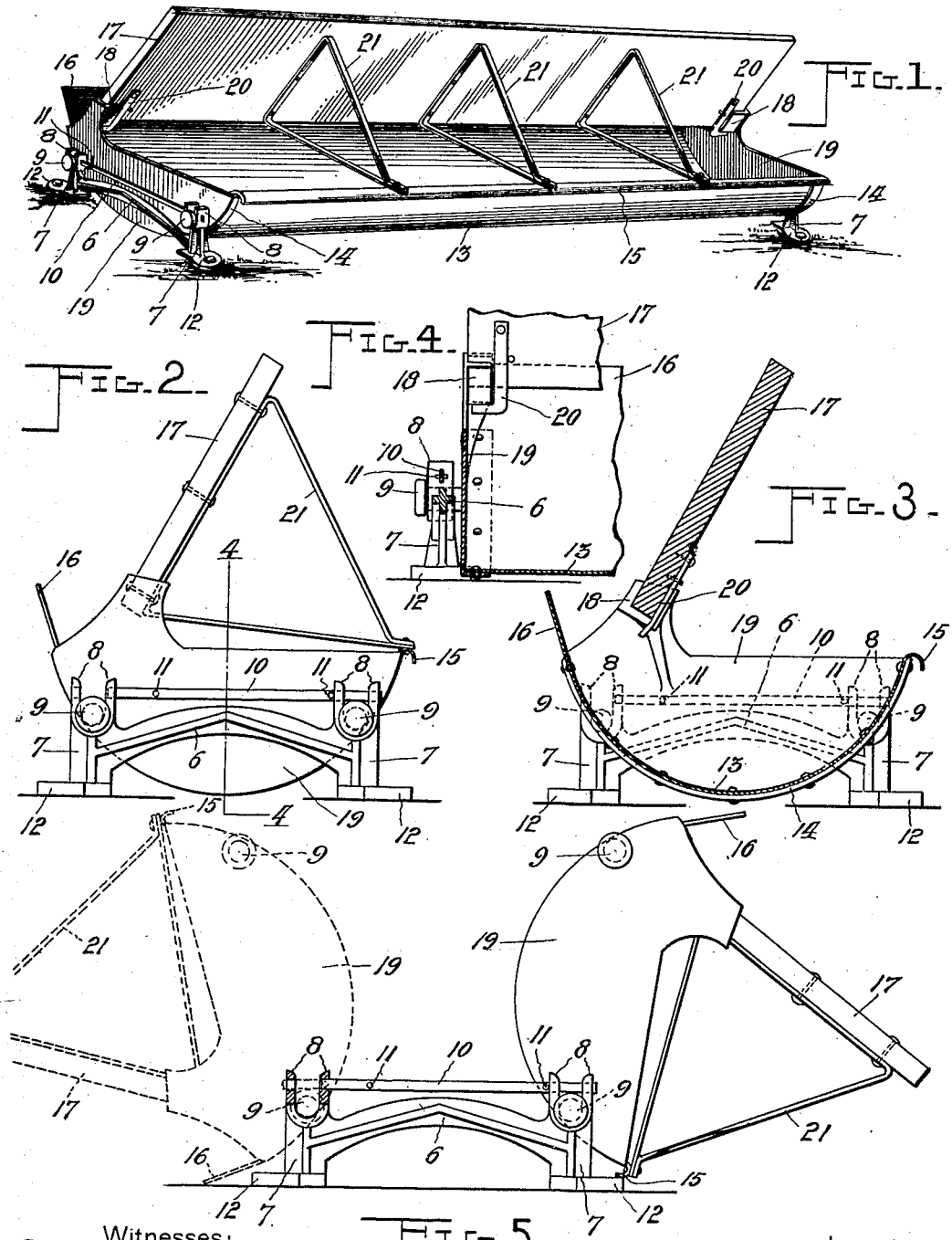
Witnesses:
John F. Deuffernie
M. Langer.
Inventor,
F. McArthur.
By F. H. Gibbs
Attorney

UNITED STATES PATENT OFFICE.

FINLAY McARTHUR, OF MONTREAL, QUEBEC, CANADA.

FEEDING-TROUGH.

No. 892,071.  Specification of Letters Patent.  Patented June 30, 1908.

Application filed January 18, 1907. Serial No. 352,943.

*To all whom it may concern:*

Be it known that I, FINLAY MCARTHUR, of Montreal, in the Province of Quebec, Dominion of Canada, and being a subject of the King of England, have invented certain new and useful Improvements in Feeding-Troughs, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

The object of the invention is to provide an improved form of feed trough which is so constructed that food, either in liquid or solid form, may be supplied thereto while animals, and particularly swine, are feeding thereat, also to so mount the trough that it may be easily dumped when required, including suitable locking means whereby the trough is locked against accidental displacement either while cleaning or as a result of movement of the animals having access thereto.

Referring to the drawings: Figure 1 is a perspective view of the invention; Fig. 2 is an end view thereof in normal position; Fig. 3 is a transverse sectional view looking toward the right of Fig. 1; Fig. 4 is a sectional view on line 4—4 of Fig. 2; Fig. 5 is a view showing in full and dotted lines respectively the feed receptacle tilted forwardly and backwardly as in dumping to clean the same.

In said drawings 6 represents the end supporting members having posts 7 terminating in bifurcations 8, whereby there are formed bearings for the trunnions 9 on the end member of the feed trough, while the vertical members of said trunnion bearings are perforated for the passage therethrough of the slidable locking rod 10 which is adapted to rest above either one of the pair of trunnions which project from the end member of the trough as may be desired. Stops 11 project latterly from the rods 10 to hold them in operative position. Extending from the posts 7 at their base are abutment flanges 12 which serve as stops when the feed receptacle is rocked to the position shown by full lines in Fig. 5.

The trough proper, or feed receptacle, has a bottom 13 formed of sheet metal riveted to inturned flanges 14 on the end members and preferably rests on said flanges thereby deriving support therefrom.

The sheet metal bottom is bent outwardly and downwardly as shown at 15 whereby there is presented a somewhat sharp edge to prevent the swine rooting to an extent that will upset the trough, while the rear edge portion 16 is carried upwardly to form a feed apron on to which may be poured food in fluid form and said apron extends preferably slightly above the plane of the lower edge of the obliquely disposed guard member 17 which rests in integral pockets 18 formed on the end walls 19 so as to prevent the swine feeding at the rear side of the trough. Another advantage in the described relative arrangement of the apron 16 and guard 17 is that there is no danger of accidental loss of food placed in the trough at the rear side thereof.

Secured to the guard 17, near each end, is a locking hook 20 which engages the under side of said pockets to lock said guard in position while partition members 21 of triangular form are disposed at convenient distances apart to keep the animals separated while feeding and said partition members are preferably secured to said guard and to the flange 15 before referred to, though it is evident that any form of partition may be used and they may be placed at both ends of the trough if desired.

In operation the trunnions rest in their bearings and the trough may be locked against tilting in either direction or the locking rods may be slid to position over the forward trunnions to permit tilting forwardly, as shown in full lines in Fig. 5, or to position over the rear trunnions to permit tilting rearwardly, as shown by dotted lines in Fig. 5, which tilting is desirable when cleaning the trough.

I claim:

1. In a feed trough, the combination comprising end supporting members, having trunnion bearings therein, a feed receptacle rockably mounted thereon and a locking rod slidable longitudinally of one end supporting member.

2. In a feed trough, the combination comprising end supporting members, having trunnion bearings near each end thereof; a sheet metal feed receptacle, with end walls and trunnions extending from said end walls; means for locking said trunnions in said bearings, an obliquely extending guard connected with said feed receptacle and substantially triangular partition members connected with said guard and feed receptacle.

3. In a feed trough, the combination comprising end supporting members, having trunnion bearings near each end thereof; a sheet metal feed receptacle, with end walls and trunnions extending from said end walls; means, comprising a slidable rod and a seat therefor, for locking said trunnions in said bearings, an obliquely extending guard connected with said feed receptacle and substantially triangular partition members connected with said guard and feed receptacle.

4. In a feed trough, the combination comprising a feed receptacle, an obliquely extending guard, division members connected with said guard and with the feed receptacle, trunnions projecting longitudinally from said feed receptacle and an end supporting member at each end of said feed receptacle, said members having a trunnion socket near each end thereof.

5. In a feed trough, the combination comprising a feed receptacle, an obliquely extending guard, division members connected with said guard and with the feed receptacle, trunnions projecting longitudinally from said feed receptacle and an end supporting member at each end of said feed receptacle, said members having a trunnion socket near each end thereof and a longitudinally slidable locking rod mounted in one of said supporting members.

6. In a feed trough, the combination comprising a feed receptacle formed of sheet metal, with end members connected thereto said end members having integral sockets formed thereon; an obliquely extending guard resting in said sockets; approximately triangular division members secured to said feed receptacle and said guard member, end supports with trunnion bearings therein, trunnions extending from the end members of the feed receptacle and resting in said bearings and locking means for said trunnions.

7. In a feed trough, the combination comprising a feed receptacle formed of sheet metal, with end members connected thereto, said end members having integral sockets formed thereon; an obliquely extending guard resting in said sockets the feed receptacle having an apron rising obliquely behind said guard to approximately the plane thereof; approximately triangular division members secured to said feed receptacle and said guard member, end supports with trunnion bearings therein, trunnions extending from the end members of the feed receptacle and resting in said bearings and locking means for said trunnions.

In witness whereof I have hereunto set my hand in the presence of two witnesses.

FINLAY McARTHUR.

Witnesses:
 F. H. GIBBS,
 M. LANGER.